UNITED STATES PATENT OFFICE.

WALTER BONSOR, OF SOUTH BEND, INDIANA, ASSIGNOR OF ONE-HALF TO WALTER C. STEENBURG, OF SOUTH BEND, INDIANA.

CARBONIZING METHOD.

1,422,530.      Specification of Letters Patent.      Patented July 11, 1922.

No Drawing.     Application filed March 6, 1922. Serial No. 541,560.

*To all whom it may concern:*

Be it known that I, WALTER BONSOR, a citizen of the United States, residing at city of South Bend, in the county of St. Joseph and State of Indiana, have invented new and useful Improvements in Carbonizing Methods, of which the following is a specification.

The present invention relates to improvements in carbonization methods and will be fully understood from the following description.

In accordance with the present invention, I effect the carbonization of steel or other ferrous material by heating while excluding air in the presence of the substantially dry solid matter of a humus soil found in certain localities of the United States, for example, in the neighborhood of South Bend, Indiana. This type of humus soil is characterized by its high carbon and nitrogen contents. The percentage of carbon in the material is in excess of 30%, varying from 30 to 35%. The nitrogen present in this type of humus soil is in excess of 3% and varies from 3 to 4.2%, based on moisture-free material. With these is associated lime (CaO) in lime salts to the extent of about 5%, the minimum found being about 4.4%.

The humus soil is prepared for use by carefully drying it until substantially free from moisture. It may be satisfactorily used, however, if its moisture content does not exceed 15%. It is carefully dried for use by any suitable means, for example, by means of an internal rotary drum drier, conveyer drier, or any other suitable device and in drying it assumes a granular form, which is admirably adapted for use in the carbonizing process. The dried humus soil having the characteristics above set forth, is packed against the ferrous surfaces to be carbonized in the usual manner, air being excluded, and heated to a suitable heat to effect carbonization. The temperature of heating and the length of heating may be varied in accordance with the effects desired, the penetration of the carbon being very rapid. For example, carbonization at a temperature of about 1600° F. for 8 hours causes a penetration of about 0.06 inch and micro photographs of articles so carbonized indicate an even deeper penetration of the carbon into the matrix surrounding the crystal grains of the metal. After carbonization, the cooling, hardening and tempering of the treated articles is carried out in the usual manner.

I claim:

1. The method of carbonizing ferrous metal which consists in heating the ferrous metal in contact with humus soil containing less than 15% of moisture and characterized in that its dry solids contain more than 30% of carbon and more than 3% of nitrogen, with lime salts to the extent of not less than 4.4% CaO.

2. The method of carbonizing ferrous metal which consists in heating the ferrous metal in contact with substantially dry humus soil characterized in that its carbon content is over 30% and its nitrogen content over 3%, with lime salts to the extent of not less than 4.4% CaO.

3. As a material for carbonizing ferrous surfaces, dried humus soil having a moisture content less than 15% and characterized in that the percentage of carbon in the solids thereof is in excess of 30% and the percentage of nitrogen is in excess of 3%, with lime salts to the extent of not less than 4.4% CaO.

4. As a material for carbonizing ferrous surfaces, graulated, substantially dry humus soil having a carbon content over 30% and a nitrogen content over 3%, with lime salts to the extent of not less than 4.4% CaO.

WALTER BONSOR.